United States Patent [19]

Bisonaya

[11] 4,456,287
[45] Jun. 26, 1984

[54] ROTARY COUPLING
[75] Inventor: Rudy Bisonaya, Oak Lawn, Ill.
[73] Assignee: Elkay Manufacturing Company, Oak Brook, Ill.
[21] Appl. No.: 339,685
[22] Filed: Jan. 15, 1982
[51] Int. Cl.³ .................. F16L 27/00; F16L 17/00; F16L 19/06
[52] U.S. Cl. ........................ 285/281; 285/98; 285/341; 285/354; 137/615; 137/801
[58] Field of Search ............... 285/281, 280, 354, 98, 285/341; 137/615, 801

[56] References Cited
U.S. PATENT DOCUMENTS

| 1,043,294 | 11/1912 | Brinkop . |
| 1,075,693 | 10/1913 | Cassidy . |
| 1,908,844 | 5/1933 | Holtson . |
| 2,229,587 | 1/1941 | Parker . |
| 2,367,809 | 1/1945 | Stein et al. . |
| 2,414,997 | 1/1947 | Atkins . |
| 2,431,120 | 11/1947 | Howe . |
| 2,460,032 | 1/1949 | Risley . |
| 2,654,390 | 10/1953 | Archer et al. . |
| 2,724,602 | 11/1955 | Carey et al. . |
| 2,770,475 | 11/1956 | Rafferty . |
| 2,833,568 | 5/1958 | Corsette ........................ 285/281 |
| 3,113,792 | 12/1963 | Brown . |
| 3,488,073 | 1/1970 | Wold . |
| 3,764,169 | 10/1973 | St. Clair . |
| 3,807,773 | 4/1974 | Brune ........................ 285/354 X |
| 3,893,719 | 7/1975 | Eidelberg et al. . |
| 4,037,624 | 7/1977 | Turner ........................ 137/615 |
| 4,054,157 | 10/1977 | Moseley, Jr. ........................ 285/354 X |

FOREIGN PATENT DOCUMENTS 1044725 12/1978 Canada .
1012713 12/1965 United Kingdom ........... 285/354

Primary Examiner—Richard J. Scanlan, Jr.
Attorney, Agent, or Firm—Leydig, Voit, Osann, Mayer and Holt, Ltd.

[57] ABSTRACT

A rotary coupling for connecting tubular members is disclosed including a first tubular base member having external threads and a second tubular member with one end telescopically mounted within the first tubular member. Near the lower end of the second tubular member there is provided an exterior circumferential bead and a bearing member shown as a split ring is provided which encircles the lower end of the tubular member and holds it against relative axial movement. An O-ring seal is also fitted over the second tubular member within the bearing member. A retaining nut encircles the second tubular member and threadably engages the external threads of the first tubular member. When the nut is tightened, the bearing member axially grips the bead, with a lip on the bearing member engaging the bead flexing so that the telescoped members can still rotate relative to each other.

13 Claims, 7 Drawing Figures

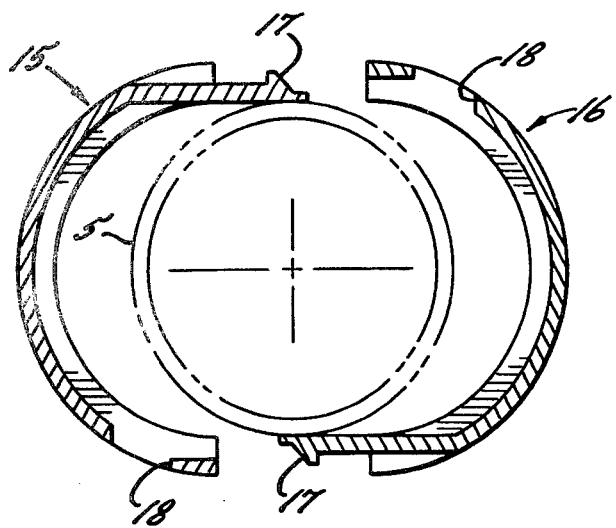 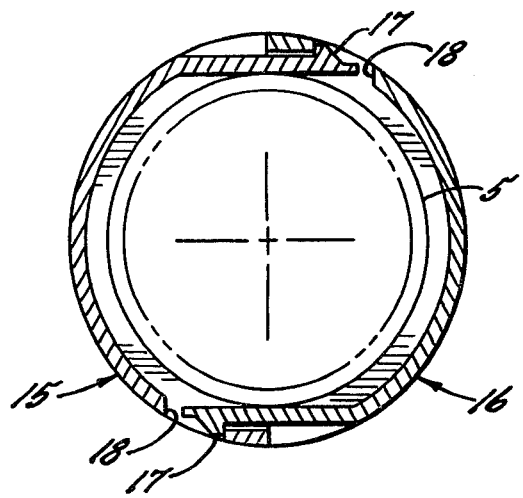
fig. 4.   fig. 5.
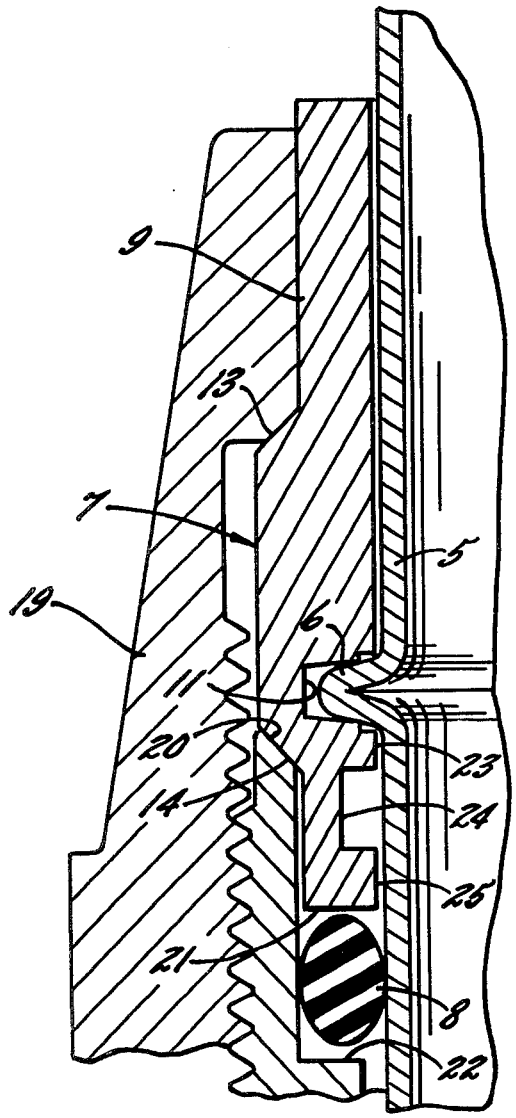 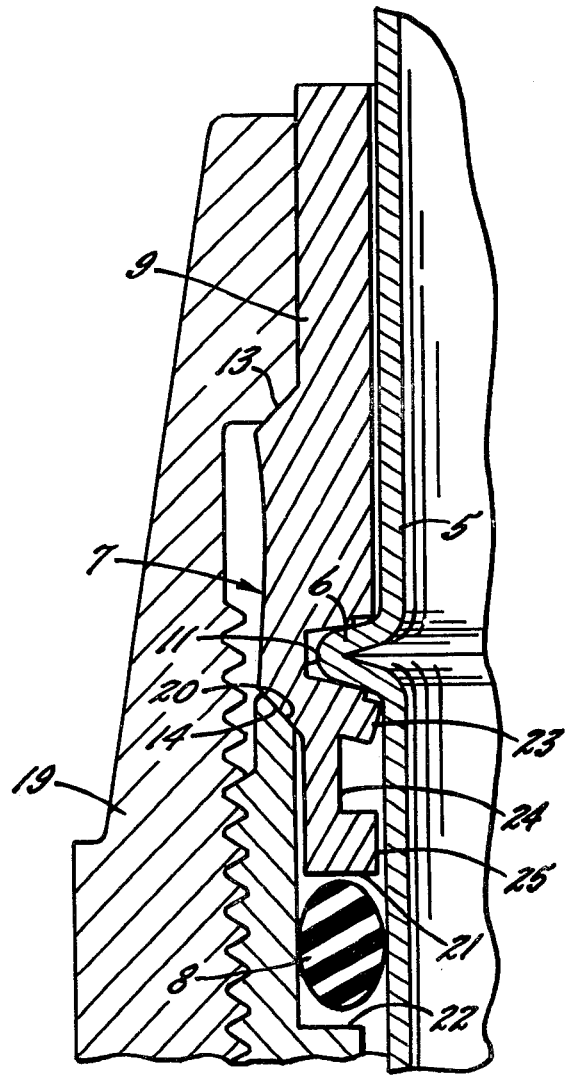
fig. 6.   fig. 7.

ROTARY COUPLING

TECHNICAL FIELD

The present invention relates generally to couplings for rotatably mounting one tubular member relative to another and, more particularly, to rotary couplings for faucets and the like where it is desired that a tubular spout be rotatably mounted on a faucet base so that it can be swung from side to side. It also relates to bearing members for use in such rotary couplings.

BACKGROUND ART

A variety of rotary couplings has been used for rotatably connecting a tubular riser portion of a spout to a faucet base. Typically these designs comprise a sleeve or snap-ring fitted into a groove in one of the tubular members, with sealing effected by an O-ring secured in a second groove.

Prior art couplings have suffered from various deficiencies. The principal problem is encountered when the retaining or connecting nut securing the two tubular members is over tightened in an effort to overcome the effects of a sloppy fit due to radial clearances between the members. In this situation drastically greater rotational torque is required to rotate the tubular members relative to each other. Additionally, the coupling may be damaged. Still another problem which has been encountered is "spout-slap," which can occur when water pressure surges, e.g., when the faucet is turned on, and is due to axial clearances between the snap-ring and groove.

While it is possible to manufacture the members of close tolerances to reduce the radial and axial clearances and thereby improve the sloppy fit and reduce the "spout-snap," such improvements are usually made at the expense of increased resistance to rotational torque, particularly when the retaining nut is over tightened. Additionally, such improvements involve higher cost of manufacture. Moreover, the nature of the surfaces typically in contact with the snap-ring and O-ring when one tubular member rotates relative to the other often results in excessive wear on the snap-ring and O-ring.

DISCLOSURE OF INVENTION

The primary aim of the present invention is to provide a rotary coupling which eliminates the radial and axial clearances between such tubular members that result in sloppy fit and spout-slap without drastically increasing the rotational torque required to rotate the tubular members relative to each other.

Another object is to provide a rotary coupling for connecting a tubular riser to a faucet base which is constructed to permit a plumber installing the fixture to over torque the connecting nut without damaging the coupling or the tubular members, or eliminating the freedom to rotate the tubular riser relative to the faucet base.

Another object is to provide a rotary coupling in which minimum wear of the sealing O-ring occurs as the fixture is used.

BRIEF DESCRIPTION OF DRAWINGS

FIGS. 4 and 5 are cross sectional views along line 4—4 of FIG. 3 showing the two identical parts of the split ring bearing member separated and in interlocking configuration, respectively;

FIG. 6 is a fragmentary, enlarged axial cross sectional view of one side of the rotary coupling including a wall of the upright tubular member secured to the tubular raised and threaded boss on the faucet base with a retaining nut in place over the split ring bearing member and O-ring seal; and FIG. 7 is a cross sectional view as in FIG. 6 but with the retaining nut having been tightened down to demonstrate flexure of the lower lip on the split ring bearing member.

BEST MODE FOR CARRYING OUT THE INVENTION

Figure 1:
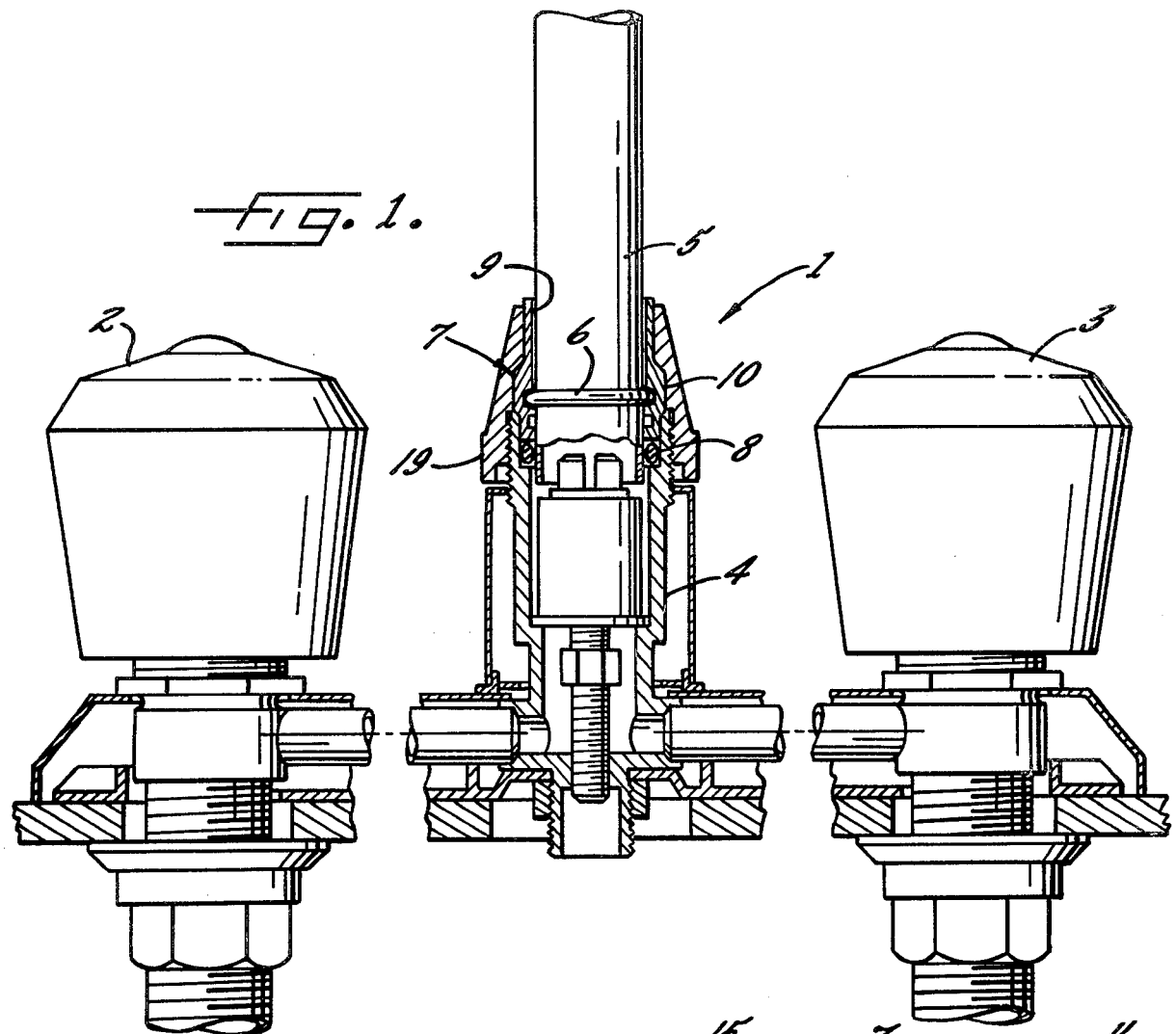
FIG. 1 is a front view, partially in cross section, of a faucet base with a rotary coupling constructed according to the present invention for mounting a tubular riser.

While the invention will be described in connection with a preferred embodiment, it should be understood that it is not intended to limit the invention to that embodiment. On the contrary, it is intended to cover all alternatives, modifications and equivalents as may be included within the spirit and scope of the invention. Specifically, while the preferred embodiment shown in the drawings and described in detail hereinafter is a rotary coupling for connecting a spout to a faucet body, it should be clear that the invention is not restricted to use in faucets, whether of the kitchen, bar or other type. The invention can be used in substantially any rotary coupling between tubular members.

Turning to the drawings and referring first to FIG. 1, a faucet generally denoted by 1 is illustrated. The faucet includes handles 2 and 3, a first tubular base member 4 having external threads and a second tubular member 5, herein shown as the lower end of the riser, with one end thereof telescopically mounted within the first tubular member 4. In carrying out the invention, near the lower end of the riser or second tubular member 5 there is provided an exterior circumferential bead 6 and a bearing member 7, herein shown as a split ring, which encircles the lower end of the tubular member 5. An O-ring 8 is also fitted over the second tubular member 5 within the bearing 7 and provides a sealing member.

Figure 2:
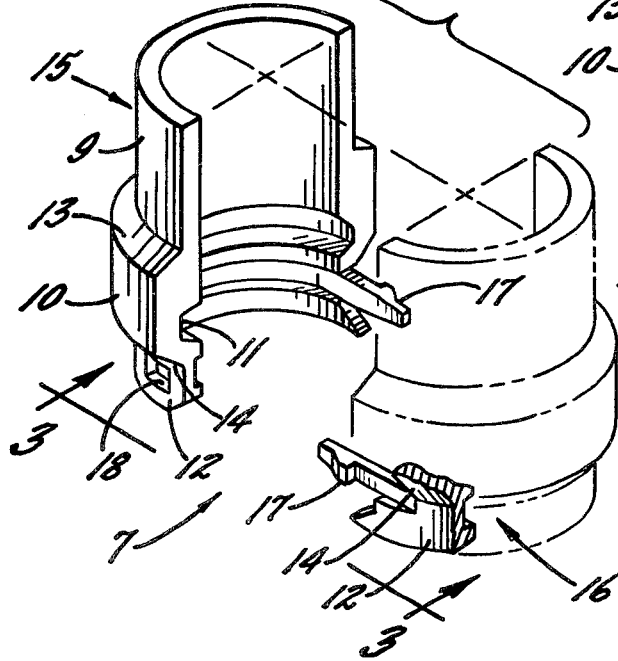
FIG. 2 is a perspective view of a split ring bearing member utilized on the rotary coupling shown in FIG. 1.
Figure 3:
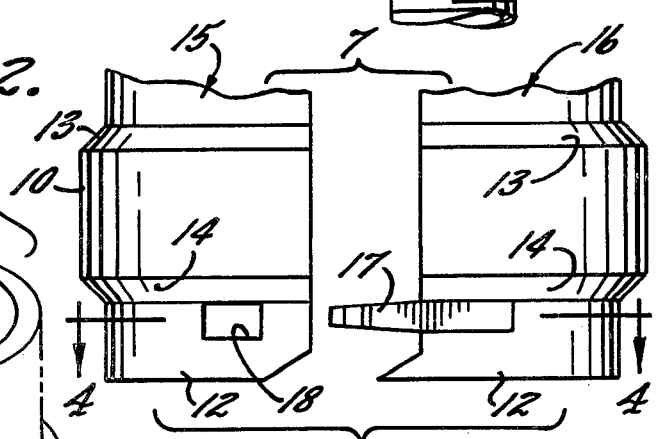
FIG. 3 is a partial front view along line 3—3 of the split ring bearing member shown in FIG. 2.

Turning to FIG. 2, in keeping with the invention the split ring bearing member 7 has (a) an upper elongated portion 9 which, as shown in FIG. 1, extends part way up the second tubular member 5; (b) an intermediate portion 10 of larger diameter (relative to the upper elongated portion 9) and which contains an internal groove 11; and (c) a lower portion 12 of decreased diameter (relative to the intermediate portion 10). The intermediate portion 10 is connected to the upper section 9 by a canted or beveled shoulder 13 and to the lower part 12 by a similar, canted or bended shoulder 14.

FIGS. 2-5 depict the manner of assembling the two identical parts 15 and 16 (which make up the split ring bearing member of the preferred embodiment) to each other about the second tubular member 5. Specifically, while the internal groove 11 fits over and receives the exterior circumferential bead of the second tubular member 5, the two identical parts 15 and 16 are held in assembled relation about the second tubular member 5 by means of two projecting hooks 17 and two slots 18. The parts 15 and 16, as discussed elsewhere herein, are made of a relatively rigid but resilient material. The projecting hook 17 on the part 16 is bent outward slightly, followed by insertion into the corresponding slot 18 on the cooperating identical part 15. In like manner the projecting hook 17 on the part 15 is inserted in the slot 18 on the part 16. In this manner the two identical parts 15 and 16 are held in position around the second tubular member 5.

As depicted in FIG. 1, a portion of the second tubular member 5, the lower part 12 of the split ring bearing member 7 and the O-ring 8 are mounted within the first tubular member 4. As can be seen by considering FIGS. 1 and 6–7, when the rotary coupling of this invention is assembled, the internal groove 11 of the split ring bearing member 7 is fitted over the bead 6 and the smaller diameter lower portion 12 of the stepped outer surface of the split ring bearing member 7 fits inside the first tubular member 4. As previously described, the split ring bearing member 7 has tapered or beveled shoulders 13 and 14 between the smaller and larger diameter portions of its outside surface. The top edge of the first tubular base member 4 has a tapered internal shoulder 20 on which rests the corresponding tapered or beveled lower shoulder 14. A retaining member, herein shown as a retaining nut 19 encircles the second tubular member 5 and threadably engages the external threads of the first tubular member 4 (threads not clearly shown on the first tubular member 4 nor on the nut 19 in FIG. 1; see, however, FIGS. 6 and 7). The retaining nut 19 also fits around the outer surface of the upper portion 9 of the split ring bearing 7 and engages its upper beveled shoulder 13.

As the retaining nut 19 is tightened, axial force is applied by the nut against the upper beveled shoulder 13 of the split ring bearing member 7 while axial force is applied in the opposite direction against the lower beveled shoulder 14 by the tubular base member 4, which axially compresses the bearing member 7. In carrying out the invention, the axial compression of the bearing member 7 as the retaining nut 19 is tightened, tends to bow the bearing member 7 inwardly while at the same time increasing the gripping force exerted on the top and bottom of the bead 6 by the lips defining the internal groove 11 of the split bearing member 7.

As the split ring bearing member 7 is compressed axially, the bead 6 tends to spread the lips defining the top and bottom of the internal groove 11 of the split ring bearing member 7. According to the invention, the flexible lip 23 defining the lower side of the internal groove 11 can flex as indicated in the drawing (compare FIGS. 6 and 7). The result is that the grip on the bead 6 does not become substantially tighter if the nut 19 is overtightened. By forming the split ring bearing member 7 with the open space (groove) 24 between the flexible lip 23 (which defines the lower side of internal groove 11 and the upper side of internal groove 24) and the lower lip 25 of groove 24, room is provided for flexure of the flexible lip 23 and binding of the tubular member 5 is avoided. Furthermore, zero clearance or positive clearance is provided between the inner diameter of the bearing member 7 and the outer diameter of the tubular member 5 such that should the retaining nut 19 be overtightened, the grip on the tubular member 5 does not become substantially tighter and the tubular member 5 retains freedom to rotate.

In this manner, the second tubular member 5 is supported in the bearing assembly by constraining the top and bottom of the bead 6 without binding the second tubular member 5 or limiting rotation relative to the first tubular member 4. Thus axial clearance is eliminated which eliminates any "spout-slap." Rather than depending on lateral support of the riser 5 for support against rocking or tipping which inherently demands minimum radial clearance to reduce the sloppy fit, the riser 5 is held against normal rocking or tipping forces by the axial squeeze on the bead 6. Thus, a tight fit results without undue limitation on the freedom of the riser 5 to rotate relative to the telescoping tubular member 4. As a further means of providing lateral support and reinforcement to resist severe rocking or tipping forces, the upper portion 9 of split ring bearing member 7 extends lengthwise of the exterior wall of the second tubular member 5. The end of this upper portion 9 also spaces the retaining nut 19 from the tubular member 5 and prevents metal-to-metal contact. Similarly, the lower end 21 of the bearing member 7 spaces the tubular member 5 and prevents undesired metal-to-metal contact between these members.

It should be noted that the preferred O-ring seal 8 encircling the cylindrical outer surface of the second tubular member 5 at its lower end, below the split ring bearing member 7 is preferably not positioned or trapped in either a groove in the second tubular member 5 or an internal groove in the first tubular member 4. Rather, it is trapped between the bottom 21 of the split ring bearing member 7 and a flat stepped portion 22 of the first tubular member 4. Because the O-ring 8 rides on the plain cylindrical outer surface of the lower end of the second tubular member 5 (typically plated and relatively smooth), the surface of the first tubular member 4 (typically a relatively rougher surface, e.g., a brass casting), will tend to hold the O-ring seal 8 in place while the second tubular member 5 rotates within the O-ring seal 8. The result is less wear on the O-ring 8, since the sliding surface is the smoother plated outer surface of the second tubular member 5, rather than the relatively rougher interior surface of the first tubular member 4.

As described above in connection with the depicted preferred embodiment, the bearing member 7 of this invention supports the second tubular member in such a manner that it is firmly gripped yet freely rotatable within the first tubular member. The bearing member, preferably a split ring bearing, of the subject invention is preferably made of a relatively rigid but resilient material. Examples of suitable material include nylon, acetal and polyester plastics. Plastics made from acetal resins are preferred.

As previously indicated, the bearing member is preferably made up of two identical parts. This is particularly desirable from the standpoint of economy in the manufacture of the bearing member. Other configurations, however, can be used.

I claim:
1. A rotary coupling comprising:
a first tubular member having exterior screw threads adjacent one end;
a second tubular member rotatably and telescopically received in said end of said first tubular member and having an exterior circumferential bead;
a bearing member encircling said second tubular member and providing an internal circumferential groove receiving said bead to hold said bearing member against relative axial movement;

said bearing member having a flexible lip defining the lower side of said groove;

a retaining nut on said second tubular member and received on said screw threads of said first tubular member and engaging said bearing member to hold said first and second tubular members in telescoping relation;

said bearing member and said first tubular member having faces cooperating when said retaining nut is tightened on said first tubular member, for axially compressing said bearing member to grip the bead, said lip being flexible to limit the gripping force on said bead for maintaining the relative rotatability of said tubular members.

2. The rotary coupling of claim 1 wherein said bearing member has a second internal groove below said groove receiving said bead which, upon tightening of said retaining nut, accomodates said flexible lip.

3. The rotary coupling of claim 1 wherein said bearing member has an upper elongated portion extending up the exterior wall of said second tubular member, providing additional lateral reinforcement.

4. The rotary coupling of claim 1 wherein said bearing is made of a rigid but resilient material.

5. The rotary coupling of claim 1 wherein said second tubular member is the riser for a faucet.

6. The rotary coupling of claim 1 wherein said bearing is made of plastic.

7. The rotary coupling of claim 1 wherein said bearing is made of acetal plastic.

8. The rotary coupling of claim 1 wherein an O-ring is positioned on the exterior surface of said second tubular member immediately below and in contact with the lower portion of said bearing member.

9. The rotary coupling of claim 8 wherein said O-ring is positioned on the plain exterior surface of said second tubular member.

10. The rotary coupling of claim 8 wherein the exterior surface of said second tubular member in contact with said O-ring is smoother than the interior surface of said first tubular member in contact with said O-ring.

11. In a rotary coupling comprising:

a first tubular member, a second tubular member having one end rotatably and telescopically received within one end of said first tubular member, a bearing member encircling said second tubular member, an O-ring fitted over said second tubular member and retaining means for securing the properly aligned and positioned parts in the desired position, the improvement comprising:

an exterior circumferential bead on said second tubular member;

an internal circumferential groove on the interior of said bearing member adapted to receive said bead and allow said bearing member to fit over and ride on said bead; and means including said retaining means for axially compressing said bearing member to axially grip said bead and hold said tubular members against normal relative rocking and tipping movement and against relative axial movement; and wherein said bearing member includes a flexible lip defining one side of said groove, said lip being flexible to limit the gripping force on said bead for maintaining the relative rotatability of said tubular members.

12. The improvements in a rotary coupling of claim 11 wherein said bearing member has zero to positive clearance with said second tubular member so that when said retaining means is tightened, the grip exerted by said bearing member on said second tubular member does not become substantially tighter.

13. The rotary coupling of claim 1 wherein said bearing member has zero to positive clearance with said second tubular member so that when said retaining nut is tightened, the bearing member is not substantially tightened on said second tubular member for maintaining the relative rotatability of said tubular members.

* * * * *